Sept. 8, 1931.　　　　E. F. ZAPARKA　　　　1,822,188
CONTROLLING DEVICE FOR VEHICLE SPRING SUSPENSION SYSTEMS
Filed March 30, 1929　　　2 Sheets-Sheet 1
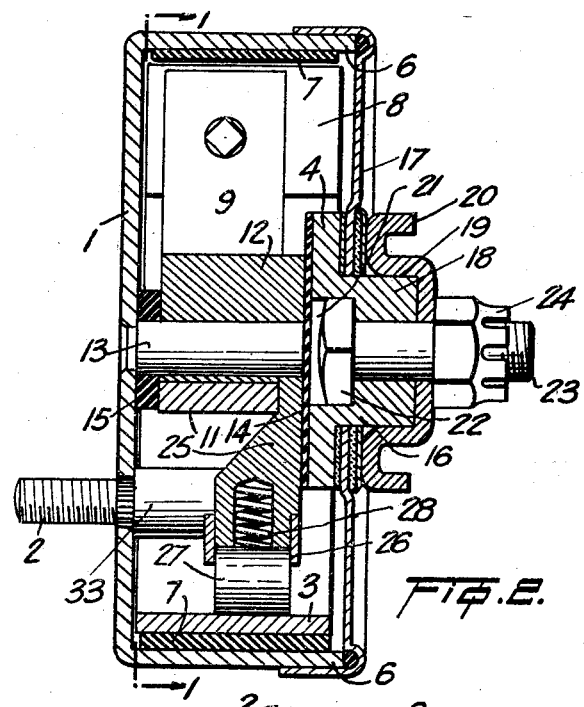
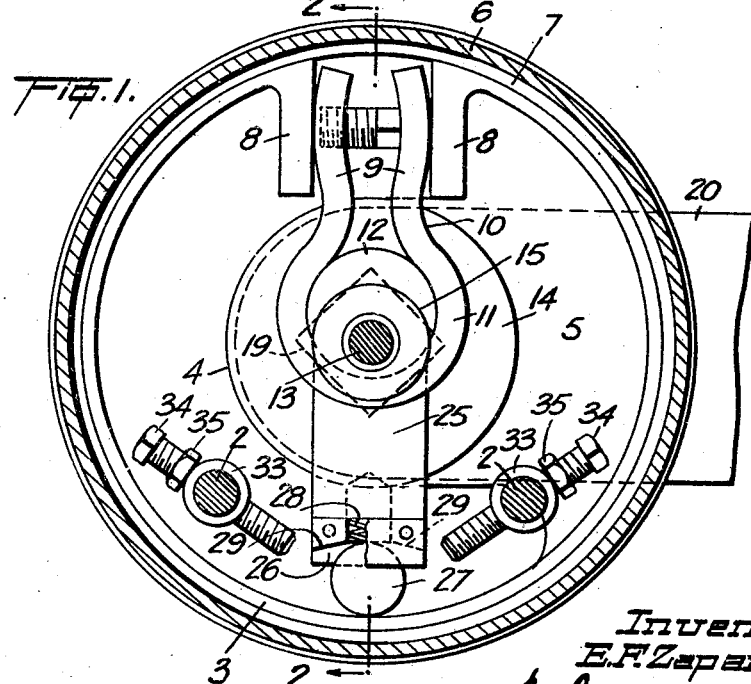
Inventor.
E. F. Zaparka Sept. 8, 1931.  E. F. ZAPARKA  1,822,188
CONTROLLING DEVICE FOR VEHICLE SPRING SUSPENSION SYSTEMS
Filed March 30, 1929  2 Sheets-Sheet 2
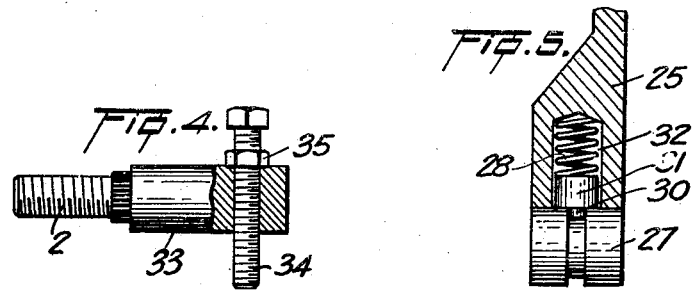
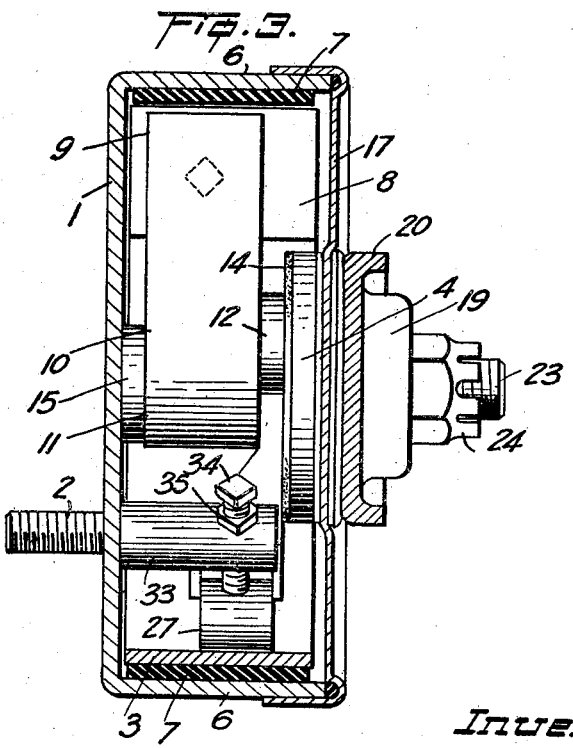
Inventor.
E. F. Zaparka Patented Sept. 8, 1931

1,822,188

UNITED STATES PATENT OFFICE

EDWARD F. ZAPARKA, OF NEW YORK, N. Y., ASSIGNOR TO LEOPARD AUTOMOBILE PRODUCTS CORPORATION, OF NEW YORK, N. Y., A CORPORATION

CONTROLLING DEVICE FOR VEHICLE SPRING SUSPENSION SYSTEMS

Application filed March 30, 1929. Serial No. 351,325.

My invention relates to improvements in controlling devices for vehicle spring suspension systems and the object of the invention is to devise a construction of controller of the mechanical friction type which will cause a "hang on" of the frictional resistance offered to the movement of the vehicle axle during the return stroke of such axle toward its normal similar to that described in my copending application Serial Number 324,480 filed December 7th, 1928.

This invention, as will hereinafter appear, discloses a different mechanical means for achieving the "hang on" to that claimed in the above mentioned application.

My invention consists of a device constructed and arranged all as hereinafter more particularly described and illustrated in the accompanying drawings in which:—

Fig. 1 represents a sectional view of my device through the line 1—1 Fig. 2.

Fig. 2 is a cross section through the line 2—2 Fig. 1.

Fig. 3 is a similar section to Fig. 2 only showing certain of the parts in the interior of my device in elevation.

Fig. 4 is an elevational detail, partly in section, showing the means for varying the extent of the "hang on", and Fig. 5 is a detail in section showing the means connected with an eccentric bushing for engaging the friction band of my device.

Like characters of reference indicate corresponding parts in the different views.

A friction drum 1 is connected to the chassis (not shown) by any suitable means such as by the bolts 2. An oscillatable split friction band 3 having a central hub portion 4 and an arm 5 connecting the hub to one end of the band, the other end of the band being free, is inserted into the drum and, as will hereinafter appear, is capable of being expanded to exert frictional pressure upon the annular wall 6 of the drum 1. If desired, a brake friction lining 7 can be interposed between band and drum wall.

The spaced apart split ends of the band 3 are provided with abutments 8 in between which are inserted the free ends 9 of the applicator lever 10 which has a boss 11 freely mounted on an eccentric bushing 12 which is in turn freely mounted on a spindle 13 having its axis coincident with the axis of drum and band.

A friction disc 14 is interposed between adjacent faces of the bushing and hub portion 4, and a resilient pressure pad 15 mounted on the spindle 13 is interposed between the other end of the eccentric bushing and the drum 1 so that pressure is always exerted by the face of the eccentric bushing on the friction disc.

A boss 16 is provided on the hub portion 4 extending outwardly through the drum cover 17 and having the squared extremity 18 which is received into the correspondingly squared socket 19 of the actuating lever 20, which latter is connected to the axle (not shown) by any suitable means. The boss 16 contains a squared recess 21 adapted to receive the head 22 of the bolt 23 which extends through boss and actuating lever, a nut 24 being threaded onto the free end of the bolt to secure the actuating lever in place on the boss.

An arm 25 connected to or forming part of the eccentric bushing 12 depends therefrom having a recess 26 in the free end thereof into which is freely inserted the roller 27, such roller being springheld by the spring 28 against the inner face of the band 3. The top of the recess 26 has opposed inclined surfaces 29 adapted to wedge the roller 27 between one of such surfaces and the band upon rotation of the latter.

As depicted in Fig. 5 the roller 27 may be grooved peripherally to receive a teat 30 on a member 31 slidable in the spring orifice 32, said spring engaging the slidable member.

The bolts 2 may be provided with inwardly extending heads 33 through each of which is threaded transversely a setscrew 34 carrying a locknut 35. If desired, independent studs may be used instead of the bolt heads.

My device functions as follows: Assuming that the actuating lever 20 and attached band 3 are rotated in a counter-clockwise direction the applicator lever will be swung to the left and the eccentric bushing, owing to the frictional engagement with hub portion 4 of the band, will be rotated in a counter-clockwise direction with a consequent swinging of the arm 25 to the right (Fig. 1) until the right hand setscrew 34 engages the roller 27, wedging it between the left hand inclined surface 29 and the band 3. Until this takes place there is no expanding of the band 3 as all the parts are moving therewith, but immediately the roller 27 is wedged between inclined surface 29 and band rotation of the eccentric bushing 12 is stopped. Further rotation of the band 3 will cause the band to exert increasing pressure on the drum wall, owing to the applicator lever being angularly displaced and spreading the ends of the band apart.

It will be observed that the arrangement for controlling the movements of the eccentric 12 to vary the diameter of the friction band 3 embodies in effect a driving clutch including the roller 27 with the cooperating inclined faces 29 of the arm 25, this clutch being controlled upon relative movement between the friction elements by means of the adjustable stops 34. This clutch is set to check the movement of the eccentric by engagement with the roller of one of the stops 34 after a predetermined movement between the friction elements, and when reverse rotation begins after such movement in either direction there will be a delay in the releasing of this clutch, thus delaying the release of pressure between the friction elements and effecting the "hang on" function.

Now when the band commences to be rotated in a clockwise direction the roller continues to be wedged between the surface 29 and the band. Thus maximum pressure of band upon drum wall is retained until the left hand setscrew 34 engages the roller releasing it and permitting the pressure to fall off as the applicator lever moves back to normal.

What I claim as my invention is:

1. In controlling devices for vehicle spring suspension systems, in combination, a drum, an expandible oscillatable friction element in the drum, means including an eccentric operable upon rotation of the friction element in one direction for increasing the diameter of the latter to exert pressure upon the drum, and means between said eccentric and friction element operable upon rotation of the latter in the other direction for effecting a "hang on" of such pressure.

2. In controlling devices for vehicle spring suspension systems, in combination, a drum, an expandible oscillatable friction element in the drum, means including an eccentric operable upon rotation of the friction element in one direction for increasing the diameter of the latter to exert pressure upon the drum, means between said eccentric and friction element operable upon rotation of the latter in the other direction for effecting a "hang on" of such pressure, and means on the drum for releasing such pressure.

3. In controlling devices for vehicle spring suspension systems, in combination, a drum, an expandible oscillatable friction element in the drum, means including an eccentric operable upon rotation of the friction element in one direction for increasing the diameter of the latter to exert pressure upon the drum, an arm extending from such eccentric, means on the arm for causing it to grip the friction element, and means on the drum for effecting the release of such grip.

4. In controlling devices for vehicle spring suspension systems, in combination, a drum, an expandible oscillatable friction element in the drum, means including an eccentric operable upon rotation of the friction element in one direction for increasing the diameter of the latter to exert pressure upon the drum, an arm extending from such eccentric, a roller on the arm springheld against the friction element, means for wedging the roller between arm and band, and means for effecting the release of the roller.

5. In controlling devices for vehicle spring suspension systems, in combination, a drum, an expandible oscillatable friction element in the drum, means including an eccentric operable upon rotation of the friction element in one direction for increasing the diameter of the latter to exert pressure upon the drum, an arm extending from such eccentric, a roller on the arm springheld against the friction element, said roller disposed in a recess in the arm with opposed inclined surfaces, and a setscrew on the drum for releasing the roller after being wedged between an inclined surface and the band.

6. In controlling devices for vehicle spring suspension systems, in combination, a drum, an expandible oscillatable split friction band in the drum, a rotatable eccentric bushing in the drum, an applicator lever freely mounted on the eccentric bushing and having its ends extending between the ends of the band, an arm on the eccentric, means on the arm adapted to grip the band, and means on the drum for releasing such grip.

7. In controlling devices for vehicle spring suspension systems, in combination, a drum, an expandible oscillatable split friction band in the drum, said band including a central portion, a rotatable eccentric bushing in the drum, friction means between the central portion of the band and the eccentric bushing, an applicator lever freely mounted on the eccentric bushing and having its ends extending between the ends of the band, an arm on the eccentric, means on the arm adapted to grip the band, and means on the drum for releasing such grip.

8. In controlling devices for vehicle spring suspension systems, in combination, a plurality of concentric friction elements mounted for relative oscillatory movement, an operating member for varying the diameter of one friction element upon relative rotary movement of said elements, a yielding driving connection between one of said friction elements and said operating member for driving the latter, a clutch device for controlling the operation of said operating member by said yielding driving connection, and automatic means for operating said clutch device.

9. In controlling devices for vehicle spring suspension systems, in combination, a plurality of concentric friction elements mounted for relative oscillatory movement, an operating member for varying the diameter of one friction element upon relative rotary movement of said elements, a yielding driving connection between one of said friction elements and said operating member for driving the latter, a clutch device for controlling the operation of said operating member by said yielding driving connection, and automatic means including adjustable controlling members for operating said clutch device.

10. In controlling devices for vehicle spring suspension systems, in combination, a plurality of concentric friction elements mounted for relative oscillatory movement, an operating member for varying the diameter of one friction element upon relative rotary movement of said elements, a yielding driving connection between one of said friction elements and said operating member for driving the latter, a clutch device for controlling the operation of said operating member by said yielding driving connection, and means for setting and releasing said clutch device during relative rotation of said friction elements in opposite directions.

11. In controlling devices for vehicle spring suspension systems, in combination, a plurality of concentric friction elements mounted for relative oscillatory movement, an operating member for varying the diameter of one friction element upon the relative rotary movement of said elements, a yielding driving connection between one of said friction elements and said operating member for driving the latter, a clutch device for controlling the operation of said operating member by said yielding driving connection, and means for setting said clutch device after a predetermined movement of said friction elements from neutral.

12. In controlling devices for vehicle spring suspension systems, in combination, a plurality of concentric friction elements mounted for relative oscillatory movement, an operating member for varying the diameter of one friction element upon the relative rotary movement of said elements, a yielding driving connection between one of said friction elements and said operating member for driving the latter, a clutch device for controlling the operation of said operating member by said yielding driving connection, means for setting said clutch device after a predetermined movement of said friction elements from neutral, and means for releasing said clutch after a predetermined reverse movement following the clutch setting movement so as to effect a delay in releasing frictional engagement between said friction elements.

EDWARD F. ZAPARKA.